United States Patent [19]

Landreth et al.

[11] Patent Number: 5,048,431
[45] Date of Patent: Sep. 17, 1991

[54] METHOD AND APPARATUS FOR REDUCING SULFUR DIOXIDE CONTENT IN FLUE GASES

[75] Inventors: Ronald R. Landreth, Crown Point; Lee R. Anderson, Griffith, both of Ind.

[73] Assignee: Inland Steel Company, Chicago, Ill.

[21] Appl. No.: 548,183

[22] Filed: Jul. 5, 1990

Related U.S. Application Data

[63] Continuation of Ser. No. 227,866, Aug. 3, 1988, abandoned, which is a continuation-in-part of Ser. No. 144,714, Jan. 14, 1988, which is a continuation of Ser. No. 4,644, Jan. 20, 1987, abandoned, which is a continuation-in-part of Ser. No. 885,463, Jul. 14, 1986, abandoned.

[51] Int. Cl.$^5$ .............................................. F23B 7/00
[52] U.S. Cl. ...................................... 110/343; 431/3; 110/344; 110/345
[58] Field of Search ............... 431/3, 4, 170; 110/343, 110/344, 345, 347; 423/244

[56] References Cited

U.S. PATENT DOCUMENTS

| | | | |
|---|---|---|---|
| 4,331,638 | 5/1982 | Michélfelder | 431/4 X |
| 4,602,573 | 7/1986 | Tanca | 110/347 X |
| 4,613,487 | 9/1986 | Yoon et al. | 110/345 X |
| 4,655,148 | 4/1987 | Winship | 110/347 |
| 4,722,287 | 2/1987 | Anderson et al. | 110/347 X |

FOREIGN PATENT DOCUMENTS

| | | |
|---|---|---|
| 0134040 | 3/1985 | European Pat. Off. . |
| 3206409 | 11/1983 | Fed. Rep. of Germany . |
| 3441726 | 5/1986 | Fed. Rep. of Germany . |

OTHER PUBLICATIONS

JAPCA, vol. 37, No. 8, Aug. 1987, pp. 968–980, "Assessment of Dry Sorbent Emission Control Technologies".

Cameron et al., "Design and Testing of a Retrofit Dry Sorbent Injection System on a 300 MW Pulverized Fuel Boiler", Published in Proceedings: 1986 Joint Symposium on Dry SO$_2$. . . Control Technologies, vol. 2, EPRI CS 4966, Dec. 1986.

Arnott, "Design and Testing of a Retrofit Dry Sorbent Injection System on a 300 MW Pulverized Fuel Boiler-Phases 1 and 2", (published Dec., 1987).

Power, Jan. 1987, pp. 63–64.

*Primary Examiner*—Carl D. Price
*Attorney, Agent, or Firm*—Marshall, O'Toole, Gerstein, Murray & Bicknell

[57] ABSTRACT

A method and apparatus are employed to reduce the sulfur dioxide produced by the combustion of a sulfur-containing fule in a combustion chamber. Part of the combustion air is introduced into the combustion chamber with and closely adjacent the fuel. Another part of the combustion air is introduced into the combustion chamber above and downstream of the fuel and relatively remote therefrom under conditions which buffer the flame front and reduce peak flame temperatures therein. Finely divided limestone particles or the like are aspirated into the combustion chamber by the air introduced above the fuel and distributed thereby throughout the gases flowing downstream through the combustion chamber wherein the limestone particles are calcined to lime particles which react with the sulfur dioxide in the combustion reaction gases to produce calcium sulfate. There is no premixing of the particles and the aspirating air before they enter the combustion chamber. Various parameters are controlled to produce the desired results.

9 Claims, 1 Drawing Sheet

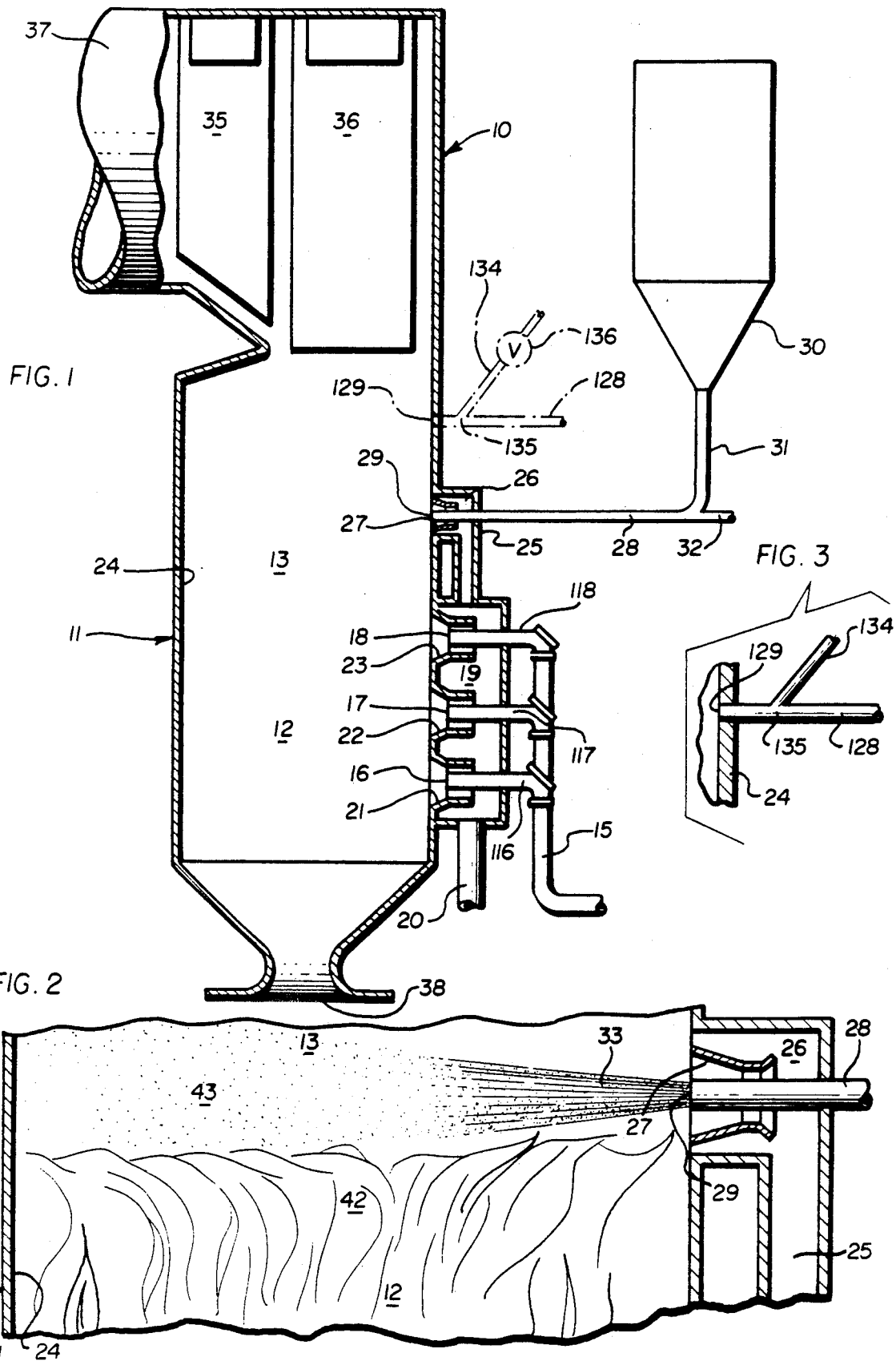

METHOD AND APPARATUS FOR REDUCING SULFUR DIOXIDE CONTENT IN FLUE GASES

RELATED APPLICATIONS

This is a continuation of application Ser. No. 07/227,866 field Aug. 3, 1988, now abandoned which is a continuation in part of application Ser. No. 144,714 filed Jan. 14, 1988 now pending, a continuation in part of Ser. 4,644 filed Jan. 20, 1987 now abandoned, and the disclosures of all these prior related applications are incorporated herein by reference.

BACKGROUND OF THE INVENTION

The present invention relates generally to the removal of pollutants from flue gases and more particularly to a method and apparatus for removing sulfur dioxide from flue gases exhausted from boilers fired with sulfur-containing fuel.

Sulfur-containing fuels, such as coal, coke oven gas or fuel oil, are typically used to fire boilers for producing steam to generate electricity and/or for heating o processing purposes. Typically, the fuel is combusted with air, in excess of the stoichiometric amount required for combustion, at a series of burners in an enclosed combustion chamber to produce combustion reaction products consisting primarily of hot gases but also containing some particulates, such as fly ash. Heat is extracted from the hot gases, in a conventional manner, to heat water and produce steam. The hot gases are flowed in a downstream direction and eventually are exhausted through a stack. Residual heat remaining in the hot gases, after completion of the steam producing function, may be used to preheat combustion air.

In the combustion chamber, the temperature decreases in a downstream direction after the last burner. Moreover, at any location along the downstream path there can be a spread of different processing temperatures across the lateral dimensions of the combustion zone. However, at any such location. There is also an average temperature, and the average temperature is the temperature reference used herein, unless otherwise indicated.

The hot gases from the combustion reaction include undesirable pollutants, both solid and gaseous. Solid particulate pollutants are usually removed in an electrostatic precipitator or a bag house or both. Gaseous pollutants have included oxides of nitrogen ($NO_x$) and sulfur dioxide ($SO_2$). Within the last few years, the $NO_x$ content of the gases has been reduced by changes in combustion techniques for oil and gas-fired boilers and by changes in burner design for coal-fired boilers.

A high sulfur dioxide content in the gases is especially undesirable because, if allowed to escape into the atmosphere, it can be a source of acid rain as well as other undesirable effects.

Attempts have been made to reduce the sulfur dioxide content of the combustion reaction gases (flue gases) by an expedient known as dry sorbent injection. A sorbent is a compound which reacts with the sulfur dioxide to produce a relatively innocuous, solid compound which can be removed from the flue gases with conventional particulate removal apparatus. Examples of dry injection sorbent materials previously employed to remove sulfur dioxide from flue gases resulting from the combustion of coal include the carbonates or hydroxides of magnesium and calcium. Limestone (calcium carbonate) particles have been employed as a dry sorbent injection material in coal fired boilers. In such a system, the sulfur dioxide in the flue gases is converted to calcium sulfate, an innocuous solid compound which can be employed as a construction material or which may be buried in a land fill without concern for adverse effects on the environment. Initially, the particles of limestone or calcium carbonate ($CaCO_3$) are calcined into lime (CaO) by the heat from the combustion reaction, and the lime reacts with the sulfur dioxide, in the presence of oxygen (from the excess air in the combustion chamber) to produce calcium sulfate ($CaSO_4$).

As noted above, oxides of nitrogen in the flue gases have been reduced by employing an improved burner design. Such a burner design generally includes a nozzle through which the fuel is injected into the combustion chamber together with so-called primary air. Also injected into the combustion chamber, at locations closely adjacent the fuel nozzle, is secondary air which, together with the primary air, accounts for about 0.7–1.0 times the stoichiometric amount of oxygen required for complete combustion. In addition to the primary and secondary air, tertiary air is also injected into the combustion chamber from locations either closely surrounding, or remotely spaced in a downstream direction from, the inlets for the secondary air.

Employing a burner arrangement of the type described in the preceding paragraph reduces or eliminates peak flame temperatures, the presence of which accounts for oxides of nitrogen produced from nitrogen in the combustion air. The aforementioned burner arrangement also reduces the oxygen concentration in the pyrolysis or chemical reaction zone of the flame, which controls the formation of oxides of nitrogen from the nitrogen contained in the fuel.

Attempts have been made by others, at least on a test basis, to inject limestone particles in a system employing burners of the type producing a low percentage of oxides of nitrogen, hereinafter referred to as low $NO_x$ burners. In these attempts, limestone has been injected into the combustion chamber through the fuel nozzles, through the inlets for introducing the secondary air (located closely adjacent the fuel nozzle), through tertiary air inlets closely surrounding the inlets for the secondary air, and through separate limestone-injecting inlets spaced relatively far downstream from the inlets for the fuel and the combustion air. In the first three instances, the limestone was premixed with the fuel and/or the combustion air entering the combustion chamber at the secondary and tertiary air inlets.

There are drawbacks to all of the limestone injection techniques described in the preceding paragraph. Injection through the fuel nozzle or through secondary air inlets immediately adjacent the fuel nozzle or through tertiary air inlets closely surrounding the secondary air inlets subjects the limestone particles to relatively high temperatures for relatively long periods of time, and this can cause sintering of the resulting lime particles which reduces their surface area and therefore their ability to react with $SO_2$, thereby decreasing $SO_2$ removal. Introducing the limestone particles relatively far downstream from the fuel nozzles and combustion air inlets decreases $SO_2$ removal because the temperature conditions are too low and/or decrease too rapidly.

Premixing the limestone particles with the combustion air causes erosion and pluggage problems in the transporting conduits for the combustion air and reduces substantially the accuracy with which the particles can be divided among the substreams to the individual air outlets, a multiplicity of which are usually employed. These problems arise from the high velocity at which the combustion air flows through the transporting conduits, e.g. 2,500–5,000 ft/min. (762–1524 m/min.) and the fact that the limestone particles are carried in dilute phase transport.

If the velocity of the transporting combustion air is reduced to decrease the erosion and pluggage problems, the volume of the transporting air has to be increased in order to carry the limestone in dilute phase transport at the slower speeds; and this could result in more combustion air at a given outlet, or series of outlets, than is desired from the standpoint of combustion or other considerations. Moreover, lowering the velocity at which the combustion air is introduced into the combustion chamber reduces the turbulence and mixing action due to the combustion air, and such a reduction is undesirable. Furthermore, a minimum velocity is necessary in order for the combustion air to properly distribute within the combustion chamber the limestone particles carried by the combustion air.

The use of a large volume of air to transport and/or introduce the limestone particles into the combustion chamber has a substantial adverse effect on the ability of an electrostatic precipitator to remove particulates from the combustion reaction gases. This is because the electrostatic precipitator is usually sized for a given volume of air, i.e. only the air volume normally employed for combustion purposes (e.g. primary, secondary and tertiary air in a low $NO_x$ burner system). When a substantial additional volume of air is present as a result of limestone particle transport and introduction, an electrostatic precipitator, sized to handle a smaller volume, will not function properly.

SUMMARY OF THE INVENTION

In accordance with the present invention, sulfur dioxide in the flue gases is removed by employing a combination of limestone particle injection and a low $NO_x$ burner system employing overfire air, with certain parameters controlled in a particular manner in order to obtain the desired results.

Fuel, such as pulverized coal, and primary and secondary air are introduced into a first combustion zone. Tertiary air is introduced into a second combustion zone located downstream, typically above, and relatively remotely spaced from the first combustion zone. When introduced at such a location, the tertiary air is referred to as overfire air.

As the combustion reaction gases or flue gases flow downstream from the first combustion zone through the second combustion zone and further downstream therefrom, they lose heat relatively rapidly in the process of heating water to produce steam.

The air introduced into the first combustion zone is hereafter referred to as the major portion of the combustion air, and the tertiary air, introduced into the second combustion zone as overflowe air, is hereinafter referred to as the second portion of combustion air.

In one embodiment of the present invention, limestone particles or the like are introduced into the second portion of combustion air which has a velocity sufficient to aspirate the limestone particles into and distribute them throughout the gases flowing downstream through the second combustion zone. There is no premixing of the limestone particles and the second portion of combustion air before they enter the second combustion zone.

In the first combustion zone, at least the peak flame temperatures, if not the average flame temperature, are above the temperature at which limestone and lime particles will sinter. Calcination of the particles to lime occurs s rapidly that sintering considerations apply essentially only to the lime particles. Sintering of the lime particles is undesirable as it will lower the reactivity of the lime particles. Accordingly, the second portion of combustion air is provided with a velocity sufficient to buffer peak temperatures in the flames from the first combustion zone and spread out and provide a relatively uniform flame front in the second combustion zone. As a result of the velocity and entry location of the second portion of combustion air, there is an average processing temperature range, downstream of the first combustion zone, which is below the sintering temperature for the lime particles (2400° F. or 1316° C.), as well as below the temperature at which calcium sulfate decomposes into lime and gaseous oxides of sulfur (2460° F. or 1349° C.). In addition, there are substantially no peak flame temperatures, downstream of the first combustion zone, which are high enough to have an adverse sintering effect on the lime particles.

The aforementioned average processing temperature range is high enough (above 1600° F. or 871° C.) and prevails long enough (longer than 0.5 sec.) to react the lime produced downstream of the first combustion zone with the desired amount of $SO_2$ gas during the time in which the lime and the $SO_2$ gas are subjected to the average processing temperature range.

When the second portion of combustion air is introduced into the second combustion zone, there is turbulence. Because the limestone particles are introduced into the second portion of combustion air as the latter is introduced into the second combustion zone, and because the second portion of combustion air is introduced into the second combustion zone at such a high velocity (e.g. 5,000 ft/min.) (1,524 m/min.), it is not necessary to transport the limestone particles u to the inlet to the second combustion zone at the relatively high velocity necessary for distributing the limestone particles throughout the second combustion zone. Distribution is effected by the high velocity of the second portion of combustion air with which the limestone particles are introduced and by the turbulence in the second zone. One need only provide the limestone particles with a velocity merely high enough to transport the limestone particles up to the inlet to the second combustion zone. Dense phase transport of the limestone particles is sufficient to accomplish this.

Because the limestone particles are not premixed with the second portion of combustion air, there are no erosion or plugging problems of the kind which arise when limestone particles are conveyed by high speed combustion air. At the same time, the combustion air may be transported at high speeds undictated by erosion or plugging considerations, and the volume of the combustion air is undictated by limestone transporting considerations.

Because the limestone particles are conveyed in dense phase transport, they may be accurately divided into respective substreams, to whatever extent desired, for a multiplicity of outlets at the second zone.

In addition, because the limestone particles are conveyed in dense phase transport, and because the amount of extraneous air (i.e. air not required for combustion)

introduced with these particles is relatively insignificant, there is no substantial adverse effect on the ability of the electrostatic precipitator to remove particulates from the combustion reaction gases.

In another embodiment of the present invention, the limestone particles are conveyed under dense phase transport up to a location adjacent the inlet to the second combustion zone and there mixed with booster air to increase the velocity of the solids/gas mixture to a level sufficient to distribute the particles across the second zone against the urging of the downstream-moving flue gases. The limestone particles are introduced into the second combustion zone independent of overfire air which may (preferably) or may not be employed in a combustion system using this embodiment of the present invention. Both embodiments of the present invention employ dense phase transport up to a location at least adjacent the inlet or entry to the second combustion zone and the advantages arising from employing dense phase transport are present in both embodiments.

The $SO_2$ content of flue gases exhausted from the stack of a boiler operated in accordance with the present invention is 400-500 parts per million (ppm).

Other features and advantages are inherent in the method and apparatus claimed and disclosed or will become apparent to those skilled in the ar from the following detailed description in conjunction with the accompanying diagrammatic drawings.

BRIEF DESCRIPTION OF THE DRAWINGS

FIG. 1 is a vertical sectional view of an embodiment of an apparatus employed in accordance with the present invention;

FIG. 2 is an enlarged, fragmentary view of a portion of the apparatus shown in FIG. 1; and FIG. 3 is a fragmentary sectional view of a portion of another embodiment of apparatus employed in accordance with the present invention.

DETAILED DESCRIPTION

Referring initially to FIG. 1, indicated generally at 10 is an embodiment of a boiler for combusting fuel to heat water to generate steam. The embodiment illustrated in FIG. 1 is vertically disposed. Boiler 10 comprises a combustion chamber indicated generally at 11 having first and second combustion zones 12, 13 respectively. Combustion chamber 11 is defined by heat exchange walls 24 on the opposite side of which water is flowed, in a conventional manner, for absorbing heat from combustion chamber 11 generated therein by a combustion reaction. For example, heat exchange walls 24 can be a ring of vertical tubes through which water is flowed.

Communicating with first combustion zone 12 are plurality of vertically spaced nozzle 16, 17, 18 for introducing fuel and primary air into first combustion zone 12. A line 15 communicates with each of nozzles 16, 17, 18 through respective branch lines 116, 117 and 118 for introducing fuel and primary air into the nozzles. Located adjacent nozzles 16, 17, 18, around the nozzles, are respective ports 21, 22, 23 for introducing secondary air into the combustion chamber. Typically, there are two nozzles and two ports at each vertical level in FIG. 1, for a total of six of each. Ports 21-23 communicate with a pressurized wind box 19 in turn communicating with the upstream end of a conduit 20 for introducing preheated air into wind box 19.

Communicating with an upstream end of wind box 19 is a conduit 25 for conducting preheated air into a wind box extension 26 communicating with a series of peripherally spaced tubular ports 27 for introducing tertiary air as overfire into second combustion zone 13. Only one port 27 is shown in FIG. 1, but there are typically six such ports at the same vertical level. Second combustion zone 13 and tubular port 27 are spaced above all of the nozzles 16-18 and are relatively remote therefrom in a downstream direction. As shown in FIG. 1, combustion chamber 11 is devoid of any provision for introducing air downstream of tertiary (overfire) air ports 27.

Disposed substantially coaxially within tubular port 27 is a pipe 28 terminating at an open downstream end 29. Pipe 28 is employed to inject limestone particles into the stream of tertiary air as the stream enters second combustion zone 13. There is no premixing of the limestone particles in pipe 28 with tertiary air before the particles enter second combustion zone 13 at pipe end 29.

In a typical embodiment employing six peripherally spaced tertiary air ports 27, a pipe 28 may be associated with four of the six ports. Introducing the limestone particles through four peripherally spaced ports 27 assists in the widespread horizontal distribution of limestone particles in second zone 13 compared to introduction through only one or two ports.

The limestone particles are stored in a hopper 30 which feeds into a conduit 31 extending downwardly from hopper 30 to line 28. Communicating with pipe 28 is a conduit 32 through which flows a transport gas for transporting the limestone particles from hopper 30 through pipe 28.

Limestone particles are the preferred material for producing lime particles by calcination in the combustion chamber. Other finely divided materials, which form lime particles upon exposure to the heat in the second combustion zone, may be employed. These include calcium hydroxide, $Ca(OH)_2$, and dolomite, $CaMg(CO_3)_2$, which calcines to produce a reaction product which is about 80 wt.% lime and 20 wt.% MgO. The MgO does not usually participate in $SO_2$ removal to any substantial degree in the method of the present invention.

Combustion reaction gases are generated in combustion chamber 11 and flow upwardly (downstream) past primary and secondary superheaters 35, 36 respectively for superheating the steam generated at boiler 10. The combustion reaction gases, or flue gases, then flow downstream through a conduit 37 which communicates with conventional apparatus (not shown), such as an electrostatic precipitator, for removing particulates from the flue gas and with conventional heat exchange apparatus (not shown) for preheating the air which is eventually flowed through conduit 20 and line 15. Eventually, the cooled, cleaned flue gases are exhausted into the atmosphere through a stack (not shown).

Located at the bottom of boiler 10 is an opening 38 for removing ash particles generated during the combustion reaction within chamber 11.

In accordance with the present invention, a mixture of primary air and a sulfur-containing fuel are flowed through line 15 into nozzles 16-18. The sulfur-containing fuel may be coal, fuel oil, or coke oven gas, for example. The total amount of primary, secondary and tertiary air is in excess of the stoichiometric amount required to combust the fuel introduced through nozzles 16-18. Typically, there is enough air to provide an oxygen content about 3% greater than the stoichiometric quantity required to combust all the fuel.

A major portion of the combustion air is introduced into first combustion zone 12, through nozzles 16-18 and ports 21-23, together with or closely adjacent the fuel to at least partially combust the fuel. A second portion of air, constituting the remainder of the air or tertiary air, is introduced as overfire air into the combustion chamber at second zone 13 through port 27.

At least some combustion occurs in first zone 12, and the contents of the first zone including the combustion reaction products as well as uncombusted fuel, if any, flow downstream from first zone 12 through second zone 13.

Flames generated in first combustion zone 12 extend downstream towards second combustion zone 13 as flame front which is not uniform, containing peak flame temperatures which are higher than other temperatures across the flame front.

In order to buffer the peak flame temperatures and provide a relatively uniform flame front in second combustion zone 13, the second portion of air is introduced at a location (port 27) and with a velocity (e.g. 5000 ft/min.) (1,524 m/min.) for accomplishing these purposes. The resulting uniform flame front, in which peak flame temperatures have been buffered, is indicated at 42 in FIG. 2. The minimum velocity of the second portion of air should be about 2,500 ft/min. (762 m/min.) in order to produce these results.

The gases moving through second combustion zone 13 include sulfur dioxide. In order to convert the sulfur dioxide to calcium sulfate, finely divided limestone particles are introduced into second zone 13 together with and under the urging of the second portion of air. As shown in FIG. 2, a stream of limestone particles 33 enters second combustion zone 13 at the downstream open end 29 of pipe 28. The second portion of air entering second combustion zone 13 at port 27 constitutes an additional gas volume distributes the limestone particles throughout the gases flowing downstream through the second zone. The limestone particles entering the second zone are flash calcined downstream of first zone 12 to produce particles of lime which reacts with at least part of any sulfur dioxide present, in the presence of oxygen from that part of the air which is in excess of that stochiometrically required to react with the fuel, to produce calcium sulfate.

The contents of second combustion zone 13 are flowed downstream away from the first and second combustion zones 12, 13.

The average temperature in first combustion zone 12 exceeds the sintering temperature of the limestone and lime particles (1316° C. or 2400° F.). The location and velocity of the second portion of air is such as to provide an average processing temperature range, downstream of first combustion zone 12 which is below the sintering temperature for the limestone and lime particles as well as being below the temperature at which calcium sulfate decomposes into lime and gaseous oxides of sulfur (1349° C. or 2460° F.). Sintering is undesirable because it decreases the surface area of the resulting lime particles which reduces the reactivity thereof. Therefore, the temperature in second zone 13 and downstream from there is high enough for flash calcination of the finely divided limestone particles but low enough to avoid sintering of the resulting lime particles.

The average processing temperature range is about 1600°-2400° F. (871°-1316° C.). This is high enough and prevails long enough for the lime, produced downstream of first combustion zone 12, to react with a desired amount of sulfur dioxide gas during the time in which the lime and the sulfur dioxide gas are subjected to that temperature range. The lime and sulfur dioxide gas are subjected to the average processing temperature range for more than 0.5 seconds, preferably at least 1.5 seconds. The limestone particles are flash calcined to particles of lime in less than 0.1 second, so that the rest of the time during which the particles are subjected to the temperature range 1600°-2400° F. (871°-1316° C.) is time in which a reaction with sulfur dioxide can occur. Below 1600° F. (871° C.) the reactions which convert sulfur dioxide to calcium sulfate are too slow to be practicable. The length of time in which sulfur dioxide and lime are subjected to the desired average processing temperature range of 1600°-2400° F. (871°-1316° C.) can be increased by reducing the amount of excess air (e.g. from 3% to 1.5%), by reducing the rate at which steam is generated (i.e. the rate at which heat is exchanged through the walls 24 of combustion chamber 12 or superheaters 35 and 36), by reducing the velocity of the gases flowing downstream from the combustion chamber, etc.

As noted above, the limestone particles introduced into second combustion zone 13 are transported up to the combustion zone by the transport gas from conduit 32. Before entering second combustion zone 13, the limestone particles have imparted thereto by the transport gas a velocity sufficient to carry the limestone particles up to the second zone but intentionally insufficient to distribute the limestone particles across the second zone. This minimizes the amount of air introduced into pipe 28 and thereby the amount of extraneous air introduced into the combustion chamber, an advantage which will be discussed more fully below.

Distribution of the limestone particles across the second zone is accomplished by the high velocity air introduced at port 27. This air has a velocity which not only buffers the flames from first combustion zone 12 but also aspirates the limestone particles into, and distributes them across, the second zone. Referring to FIG. 2, distribution is enhanced by the turbulence 43 caused at least in part when the high velocity second portion of air is directed laterally across the second zone.

In a preferred embodiment, the limestone particles are carried up to second zone 13, i.e. up to open end 29 in pipe 28, under dense phase transport. This is accomplished by mixing the limestone particles entering pipe 28 from conduit 31 with transporting air in an amount which imparts dense phase transport. The minimum solids to gas ratio for dense phase transport is about 20 to 1, and a typical ratio employed in accordance with the present invention is about 90 to 1. The minimum velocity required to provide a dense phase transport of limestone particles having a maximum particle size of minus 100 mesh on a wet screen basis is about 300 ft/min. (91 m/min.). A typical gas pressure in conduit 32 is 15-30 psig (103.5-207 kPa).

The term "wet screen basis" reflects the fact that the limestone particles have been subjected to water before screening, and this enables the screening out of particles which have undergone agglomeration as a result of being subjected to water.

The velocity with which the limestone particles are conveyed through pipe 28 to open pipe end 29 can vary over a wide range, e.g. 300 ft/min (91 m/min.) to 10,000 ft/min. (3,048 m/min.), with little effect on the limestone particle distribution in zone 13. This is because the tertiary air introduced at port 27, typically at a velocity of 5,000 ft/min (1524 m/min.), performs the totality of the limestone particles distribution function in zone 13, and this is so even when the velocity in pipe 28 is 10,000 ft/min. (3,048 m/min.). The velocity of the particles in pipe 28 plays virtually no role in the distribution of limestone particles in zone 13. The relative volume of air moving through pipe 28 is insubstantial compared to the volume of tertiary air entering zone 13 at port 27, no matter the velocity in pipe 28. Although not apparent from the drawing, in which the diameter of pipe 28 is exaggerated for illustrative purposes, the cross-sectional area of elements 25–27, through which the tertiary air is transported, is very much greater than that of pipe 28. Typically, there are six tertiary air ports 27 each having a diameter of about 9 inches (229 cm) while there are only four pipes 28 each having a diameter of 1.5 inches (38 cm). The total cross-sectional area of the latter is less than 2% of the total cross-sectional area of the former. Accordingly, one may employ a velocity in pipe 28 as low as possible, e.g. merely enough to provide dense phase transport, and it will make essentially no difference from the standpoint of particle distribution in zone 13, compared to the distribution obtained when employing a greater velocity in pipe 28.

Substantially no extraneous air is employed for introducing and distributing the limestone particles into the combustion chamber. This is because the second portion of air, which performs the limestone-introduction and distribution functions at port 27 was normally employed for combustion purposes in the absence of limestone injection. As used herein, "extraneous" air refers to air in addition to that normally employed for combustion purposes. The amount of air used for dense phase transport of the limestone particles in pipe 28 is insignificant compared to the combined major and second air portions introduced at nozzles 16–18, ports 21–23 and port 27. Because essentially all the air introduced into the combustion chamber is no more than just that amount of air which is normally introduced for combustion purposes, there is a minimization, if not a total elimination, of any adverse effect the introduction of the limestone particles under the urging of air could have on the steam generating capabilities of the fuel and combustion air, a drawback which could occur if extraneous air were used. Similarly, there is no substantial adverse effect on the ability of an electrostatic precipitator to remove particulates from the combustion reaction gases, as would occur if a significant amount of extraneous air were used.

As noted above, there is no premixing of the limestone particles with the second portion of combustion air before they enter second combustion zone 13 at 27 and 29 respectively. Therefore, the second portion of combustion air may be introduced into second zone 13 at whatever high velocity is necessary to provide the desired buffering, turbulence and particle mixing and distributing effects. There are no erosion or plugging problems in conduit 25, extension 26 or ports 27 because no limestone particles flow therethrough. The velocity and volume of combustion air introduced at ports 27 is undictated by limestone transporting considerations.

In the embodiment illustrated in FIG. 2, the overfire air is the sole additional gas volume employed to introduce the limestone particles into the combustion chamber, no particles are introduced into the chamber anywhere except at the locations where overfire air is also introduced; and no air is introduced into the combustion chamber downstream of overfire air ports 27.

The limestone particles move through conduit 28 in dense phase transport at a relatively very slow speed, e.g. about 360 ft/min. (110 m/min.), for example. At such low speeds, there is relatively no erosion in pipe 28, and the likelihood of plugging in pipe 28 is reduced substantially. The likelihood of plugging increases with the speed of particle travel. The velocity of the second air portion is 2500–5,000 ft/min. (762 –1524 m/min), so that the speed of particle travel in conduit 25 would be much faster than in pipe 28, thereby substantially increasing the likelihood of pluggage if there were premixing.

When the limestone particles move in dense phase transport, e.g. at a ratio of solids to gas of 90–100 to 1 or higher, the stream of limestone particles may be very accurately divided into substreams merely by controlling the cross-sectional area of the substream conduits. For example, a stream in dense phase transport ma be divided into two equal substreams by providing the two substream conduits with equal cross-sectional areas. This feature is not available with dilute phase transport.

As noted above, a factor which effects the conversion of sulfur dioxide to calcium sulfate is the reactivity of the lime particles. The greater the surface area of lime, the greater the reactivity. In accordance with the present invention, the desired amount of surface area is provided by supplying limestone particles smaller than 100 mesh (less than 150 microns) on a wet screen basis. Preferably, the limestone particles have a size, in the range between about 5 microns and minus 100 mesh, on a wet screen basis, sufficient to provide the reaction required to eliminate the sulfur dioxide gas to the extent required. Typically, the limestone particles comprise about 70% smaller than 200 mesh (less than 75 microns), on a wet screen basis.

If sufficient reactivity is not obtained for a given limestone particle size, reactivity may be increased by reducing the particle size, all other factors being constant. Reducing the particle size increases the surface area of the lime and results in a better distribution of the particles, but it also increases the expense. Typically, one employs the coarsest particle size, in the range of about 5 microns to minus 100 mesh, that will give the desired amount of $SO_2$ removal.

The amount of limestone injected depends upon the amount of sulfur dioxide which has to be converted to calcium sulfate and this depends upon the initial and final desired sulfur dioxide contents of the flue gases. Generally speaking, an increase in the calcium to sulfur ratio increases the sulfur dioxide removal efficiency, although not on a linear basis.

Although the second portion of air entering second combustion zone 13 at port 27 has been preheated, it is relatively cool compared to the temperatures of the gas entering zone 13 from zone 12. The limestone particles enter the second zone within the stream of air constituting the second air portion.

As previously noted, there are peak temperatures, in the contents of the first zone flowing downstream toward the second zone, which are high enough to cause sintering of the limestone particles. The second portion of air, entering through port 27, cushions the limestone particles from the peak temperatures described in the preceding sentence to prevent sintering of the limestone particles.

In another embodiment of the present invention, the limestone particles may be introduced independently of overfire air or in a system without overfire air, but still without introducing any significant amounts of extraneous air into the combustion chamber. In this embodiment, limestone particles are conveyed in dense phase transport from storage hopper 30 through a pipe 128 (FIG. 3 and dash-dot lines in FIG. 1) to a location 135 outside of combustion chamber 11 and adjacent its second zone 13. Pipe 128 terminates at chamber wall 24 at an untapered open end 129 communicating with second zone 13.

The velocity of the particles undergoing dense phase transport in pipe 128 is sufficient to flow the particles through pipe 128 up to at least location 135, but that velocity is insufficient to distribute the particles across second zone 13 against the urging of combustion gases flowing downstream from first zone 12 through second zone 13 (upwardly in FIG. 1). A tube 134 having a flow control valve 136 communicates with pipe 128 at location 135. Additional gas volume, in the form of booster air, is introduced directly into the dense phase mixture of particles and carrier gas at location 135. The booster air dilutes the mixture downstream of location 128 and increases the velocity with which the particles are transported, so that the particles enter second zone 13 at pipe end 129 with sufficient entry velocity to be distributed across the second zone against the urging of combustion reaction gases flowing downstream through the second zone. Typically, the solids/gas ratio upstream of dilution location 135 is about 100 to 1 (a dense phase) and downstream of location 128 about 10 to 1 or less (i.e. a dilute phase).

The gas pressure in pipe 128 upstream of pipe end 129 is similar to that in pipe 28 upstream of pipe end 29 in the embodiment of FIG. 2. In both embodiments the pressure is relieved at the pipe end. The gas pressure in tube 134 where it joins pipe 128 is essentially the same as in pipe 128. The cross-sectional area (or diameter) of pipe 128 downstream of location 135 (i.e. between location 135 and pipe end 129) is the same as the cross-sectional area of pipe 128 upstream of location 128 (e.g. 1.5 in. or 3.8 cm.). The mixture flowing under dense phase transport has a velocity upstream of location 135 of about 350 ft./min. (107 m/min.), for example, and the entry velocity of the dilute phase mixture into second zone 13 is in the range 2500–10,000 ft/min. (762–3,048 m/min.), for example. The velocity of the booster air at dilution location 135 is sufficient to impart the desired increase in velocity to the resulting diluted phase downstream of dilution location 135.

Dilution location 135 is adjacent second chamber zone 13. As used herein, the term "adjacent" means that the distance between dilution location 128 and pipe end 129 is insufficient to reduce the entry velocity of the dilute phase mixture below that required to obtain the desired distribution across second chamber zone 13. Typically, an "adjacent" distance for a pipe 128 of 1.5 in. (3.8 cm) diameter is in the range 1–10 ft. (30–305 cm), e.g. 5 ft. (152 cm). In comparison, the distance between the upstream end of pipe 128 (at its junction with conduits 31 and 32 and dilution location 135 can be in the range 300–800 ft. (91–244 m), for example.

Because the mixture of particles and carrier gas is conveyed up to dilution location 135 under dense phase transport, the diameter of pipe 128 is relatively small, and because dilution location 135 is adjacent second zone 13, it is unnecessary to increase the diameter of pipe 128 downstream of dilution location 135. As a result, the volume of air entering second zone 13 as part of the diluted mixture is relatively small compared to the volume which would have been required had the particles been conveyed in pipe 128 all the way from hopper conduit 31 to second zone 13 with sufficient velocity to provide the desired distribution across the second zone upon entry thereinto. This is because the farther a solids/gas mixture has to travel, the larger the pipe diameter needed in order to maintain substantially the starting velocity, and the larger the pipe diameter, the larger the volume of air for a given pressure.

As an example, consider (a) a first set of circumstances, in which a method is performed in accordance with the embodiment of FIG. 3, in comparison with (b) a second set of circumstances in which dilute phase transport is employed all the way from the junction of pipe 28 with conduits 31 and 32 (FIG. 1). In the first set of circumstances, the conditions and parameters described above in connection with the embodiment of FIG. 3 are present. Under the second set of circumstances, pipe 128 would have to be 9 in. (23 cm) in diameter compared to a diameter of 1.5 in (3.8 cm) under the first set of circumstances for the same entry velocity. The relative volumes of air are proportional to the radius squared of the pipes. Accordingly, the volume of air employed with dilute phase transport all the way (9 in. pipe) is 36 times greater than the volume of air employed with dense phase transport up to dilution location 135 and unincreased diameter thereafter (1.5 in. pipe).

The volume of air introduced into second zone 13 at pipe end 129 is relatively small, compared to the volume of air required when employing dilute phase transport all the way. The (a) volume of air introduced at pipe end 129 is also relatively insignificant compared to (b) the volume of air introduced for combustion purposes at nozzles 16–18 and ports 21–23, with or without overfire air introduced at ports 27. As a result, the low volume of air introduced at pipe end 129 has no substantial adverse effect on the ability of an electrostatic precipitator to remove particulates from the combustion reaction gases or on the operation of boiler 10.

There is a tremendous difference between (a) the temperature of the particles/carrier gas mixture, which enters second zone 13 at a temperature 50–100° F. above ambient temperature (e.g. 120–220° F. or 49–104° C.), and (b) the temperature in second zone 13, which can be in the range 2100–2400° F. (1150–1316° C.). There is a multiplying effect on air volume resulting from the tremendous temperature difference described above, and this further increases the difference in air volume to which an electrostatic precipitator is subjected, between (a) a system in which air is introduced in accordance with the present invention and (b) a system in which air is introduced with dilute phase transport all the way.

When limestone particles are employed as the sorbent material, pipe end 129 is located at an elevation or downstream position at which the temperature in second zone 13 is about 2300° F. max. (1260° C.). When calcium hydroxide particles are employed, pipe end 129 is located at an elevation at which the second zone's temperature is about 2100° F. (1149° C.). The particles may be introduced at pipe end 129 with or without overfire air introduction at port 27 where the temperature in second zone 13 is typically about 2300–2400° F. (1260–1316° C.).

As shown in FIG. 1, pipe end 129 is located above overfire air port 27, and pipe end 129 is open and untapered. The inside diameter of pipe 128 is unreduced at pipe end 129. There is no nozzle there. Nozzles are undesirable because they can result in plugging, back pressure and erosion, none of which are present with pipe end 129. Pipe end 29 (FIG. 2) has the same configuration as pipe end 129 and provides the same advantages.

There are other advantages to injecting limestone into the combustion chamber of the boiler, in addition to those described above. During operation of a boiler, deposits of soot, etc. normally form on the inside surface of the boiler walls, e.g. at second combustion zone 13. It is conventional practice to remove these deposits by employing a procedure known as soot blowing wherein steam is blown through the boiler, and this cleans off the deposits. This procedure is employed periodically during operation of the boiler (e.g. for one-half to one hour, three to six times per day). When limestone is injected into zone 13 at 27, some of the lime formed in zone 13 is unavoidably incorporated into the deposits. Lime makes the deposits more friable and easier to clean off.

Moreover, as the deposits are being removed from the boiler walls by soot blowing, lime is being introduced from the deposits, into second combustion zone 13 and above, resulting in a lowering of the $SO_2$ content because of the reaction between the $SO_2$ and the lime from the cleaned-off deposits. $SO_2$ removal is increased by 5-10% (on a 100% basis) during soot blowing. In other words, if the $SO_2$ is 40% removed before soot blowing, then it will be 45-50% removed during soot blowing. This enables one to reduce the limestone injected at 29 during the soot blowing period without a corresponding reduction in $SO_2$ removal.

Furthermore, during periods when limestone injection at 29 is temporarily suspended, $SO_2$ removal will continue because of the lime content of the deposits on the inside surface of the boiler walls. More particularly, $SO_2$ is absorbed into the deposits and reacts with the lime therein to form calcium sulfate ($CaSO_4$) there. This can continue for up to 3 days, with decreasing $SO_2$ removal, starting at about 5-7% $SO_2$ removal at the beginning of the shut down period for limestone injection. Therefore, should there be a need to shut down the limestone injecting apparatus, e.g. for maintenance, servicing or the like, $SO_2$ removal will continue for awhile, at least to some extent.

One should control soot blowing during the period when limestone injection is shut down, to retain the deposits or parts thereof, and their $SO_2$-absorbing function, during that period. For example, after $SO_2$ absorption into a deposit has occurred for awhile, there will be a buildup of calcium sulfate in an outer layer of the deposit. Soot blowing of reduced longevity, sufficient to remove only this outer layer and expose a fresh outer layer devoid of calcium sulfate would then be desirable. It would be undesirable to remove the entire deposit in one soot blowing operation. When the $SO_2$-absorbing properties of the innermost layer of the deposits has been depleted, removal of the deposits can be completed, with soot blowing.

Another advantage arising from limestone injection is the elimination of acids from the entire boiler system, both the combustion chamber and downstream components. Acids can form as a result of the combustion reaction. These acids include primarily sulfuric acid but also hydrochloric and nitric acids. Acids are undesirable because, if they precipitate out of the flue gases somewhere in the system, they can severely corrode the system's components, among other things. It has been conventional in the past to operate the boiler system in such a manner as to produce a flue gas exhaust temperature above the dew point of the acids, e.g. a stack exhaust temperature in the range 300°-350° F. (148°-177° C.). This prevents the acids from precipitating out of the flue gases anywhere in the system, but it is accomplished at the expense of heat utilization elsewhere, e.g. for generating steam.

Limestone injection forms lime which neutralizes the acids. Therefore, acid precipitation from the flue gases is not a problem, and one need not maintain the flue gases at an exhaust temperature above the dew point of the acids. As a result, the system can be operated with a lower stack exhaust temperature, e.g. 110°-250° F. (43°-121° C.), and more heat can be extracted from the flue gases to generate steam.

The foregoing detailed description has been given for clearness of understanding only, and no unnecessary limitations should be understood therefrom, as modifications will be obvious to those skilled in the art.

What is claimed:

1. In a combustion process wherein a sulfur containing fuel is introduced into a first zone of a combustion chamber, and wherein combustion air (a) is introduced into said first zone or (b) is introduced both into said first zone of said chamber downstream of the first zone, to produce downstream-flowing combustion reaction gases containing sulfur dioxide ($SO_2$), and wherein finely divided particles of a material calcineable into lime are inducted through an entry into said second zone in sufficient amount to reduce substantially the $SO_2$ content of said combustions reaction gases, the improvement comprising:

transporting a mixture of said particles and a carrier gas up to a location further from said entry than adjacent thereto, under a s dense phase transport in which the solids to gas ratio is at least about 20 to 1;

said carrier gas being incapable of distributing said particles across said second zone;

and then a adding to said mixture, at said location, an additional gas volume, not employed in said dense phase transport, to introduce said particles into said second zone and to distribute the particles across said second zone;

said additional gas volume being a booster gas introduced directly into said mixture outside said chamber, to dilute said mixture and increase the velocity a with which said particles are transported, so that the particles enter said second zone with sufficient entry velocity to be distributed across said second zone against the urging of combustion gases flowing downstream from said fist zone;

the combined amount of said booster gas and said carrier gas being relatively insignificant compared to the amount of said combustion air introduced into said chamber.

2. In a combustion process as recited in claim 1 and comprising:

employing an electrostatic precipitator downstream of said second zone, to remove particulates from said combustion reaction gases;

the volume of gas introduced into said chamber with said particles of material calcineable into lime being insufficient to have any substantial adverse effect on the ability of said electrostatic precipitator to remove particulates.

3. In a combustion process as recited in claim 1 wherein:
said carrier gas is air;
and said booster gas is air.

4. In a combustion process as recited in claim 1 and comprising:
providing said booster gas to said mixture at the same pressure as said mixture before dilution thereof.

5. In a combustion process wherein a sulfur-containing fuel and combustion air are introduced into a first zone of a combustion chamber and produce downstream-flowing combustion reaction gases containing sulfur dioxide ($SO_2$), and wherein finely divided particles of a material calcineable into lime are introduced through an entry into a second zone of said chamber, downstream of said first zone, in sufficient amount to reduce substantially the $SO_2$ content of said combustion reaction gases, the improvement comprising:
transporting a mixture of said particles and a carrier gas up to a location no further from said entry than adjacent thereto, under a dense phase transport;
said carrier gas being incapable of distributing said particles across said second zone;
and then adding to said mixture, at said location, an additional gas volume, not employed in said dense phase transport, to introduce said particles into said second zone and to distribute the particles across said second zone;
said additional gas volume being a booster gas introduced directly into said mixture outside said chamber, to dilute said mixture and increase the velocity with which said particles are transported, so that the particles enter said second zone with sufficient entry velocity to be distributed across said second zone against the urging of combustion gases flowing downstream from said first zone;
and confining said mixture, after it has been diluted with said booster gas, to a cross-sectional area no greater than the cross-sectional agree of said mixture before dilution;
said booster gas bin introduced into said mixture at a dilution location, spaced from said entry to the second zone, a distance insufficient to reduce said entry velocity below the minimum velocity required to obtain the desired distributing across said second zone.

6. A combustion apparatus comprising:
means defining a first combustion chamber zone;
means for introducing a sulfur-containing fuel and combustion air into said fist chamber zone;
means defiling a second combustion chamber zone, downstream of said fist zone;
entry means at said second zone;
means, including a first conduit, for transporting a mixture of finely divided particles and a carrier gas up to a location not further from said entry means than adjacent thereto, under a dense phase transport;
means for adding to said mixture, at said location, an additional gas volume, not employed in said dense phase transport, to introduce said particles into said second zone at said entry means and to distribute said particles across said second zone;
said means for adding additional gas volume to said mixture comprising tube means for introducing a booster gas directly into said first conduit at said location;
and a junction between said tube means and said first conduit, at said location;
the cross sectional area of the first conduit, downstream of said junction, being the same as the correctional area of the first conduit upstream of said junction.

7. A combustion apparatus comprising:
means defining a first combustion chamber zone;
means for introducing a sulfur-containing fuel and combustion air into said first chamber zone;
means defining a second combustion chamber zone, downstream of said first zone;
entry means at said second zone;
means, including a first conduit, for transporting a mixture of finely divided particles and a carrier gas up to a location no further from said entry means than adjacent thereto, under a dense phase transport;
means for adding to said mixture, sat said location, an additional gas volume, not employed in said dense phase transport, to introduce said particles into said scondzone and to distribute said particles across said second zone;
said means for adding additional ages volume to said mixture comprising tube means for introducing booster gas directly into said first conduit at said location;
a junction between said tube means and said fist conduit, at said location;
and means for providing said booster gas to said junction at the same pressure as said mixture upstream of said junction.

8. In a combustion process wherein a sulfur-containing fuel and combustion air are introduced into a first zone of a combustion chamber and produce downstream-flowing combustion reaction gases containing sulfur dioxide ($SO_2$), and wherein finely divided particles of a material calcineable into lime are introduced through an entry into a second zone of said chamber, downstream of said first zone, in sufficient amount to reduce substantially the $SO_2$ content of said combustion reaction gases, the improvement comprising:
transporting a mixture of said particles and a carrier gas up to a location no further from said entry than adjacent thereto, under a dense phase transport;
said carrier gas being incapable of distributing said particles across said second zone;
and then adding to said mixture, at said location, an additional gas volume, not employed in said dense phase transport, to introduce said particles into said second zone and to distribute the particles across said second zone;
said additional gas volume being a booster gas introduced directly into said mixture outside said chamber, to dilute said mixture and increase the velocity with which said particles are transported, so that the particles enter said second zone with sufficient entry velocity to be distributed across said second zone against the urging of combustion gases flowing downstream from said fist zone;
and on fining said mixture, after it has been diluted with said booster gas, to a cross-sectional area no greater than the cross-sectional area of said mixture before dilution.

9. In a combustion process wherein a sulfur-containing fuel and combustion air are introduced into a first zone of a combustion chamber and produce downstream-flowing combustion reaction gases containing sulfur dioxide ($SO_2$), and wherein finely divided particles of a material calcineable into lime are introduced through an entry into a second zone of said chamber, downstream of said first zone, in sufficient amount to reduce substantially the $SO_2$ content of said combustion reaction gases, the improvement comprising:

transporting a mixture of said particles and a carrier gas up to a location no further from said entry than adjacent thereto, under a dense phase transport in which the solids to gas ratio is at least about 20 to 1;

said carrier gas being incapable of distributing said particles across said second zone;

and then adding to said mixture, at said location, an additional gas volume, not employed in said dense phase transport, to introduce said particles into said second zone at said entry and to distribute e the particles across said second zone.

* * * * *